US012562900B2

(12) United States Patent
Diamond et al.

(10) Patent No.: US 12,562,900 B2
(45) Date of Patent: Feb. 24, 2026

(54) SECURE SECRETS MANAGEMENT IN AN INTEGRATION PLATFORM

(71) Applicant: Boomi, LP, Conshohocken, PA (US)

(72) Inventors: Eric Diamond, Conshohocken, PA (US); Dana Burkart, San Jose, CA (US); Aleksandr Morozyuk, East Norriton, PA (US)

(73) Assignee: Boomi, LP, Conshohocken, PA (US)

( * ) Notice: Subject to any disclaimer, the term of this patent is extended or adjusted under 35 U.S.C. 154(b) by 291 days.

(21) Appl. No.: 18/371,665

(22) Filed: Sep. 22, 2023

(65) Prior Publication Data

US 2025/0106020 A1 Mar. 27, 2025

(51) Int. Cl.
*H04L 9/08* (2006.01)
*H04L 9/40* (2022.01)

(52) U.S. Cl.
CPC ............ *H04L 9/0894* (2013.01); *H04L 9/085* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 10,708,051 B2 * | 7/2020 | Bhat | G06F 21/445 |
| 2020/0033847 A1 * | 1/2020 | Way | G06Q 10/0835 |
| 2023/0041959 A1 * | 2/2023 | Guccione | H04L 9/0822 |

* cited by examiner

*Primary Examiner* — Esther B. Henderson
(74) *Attorney, Agent, or Firm* — Procopio, Cory, Hargreaves & Savitch LLP

(57) ABSTRACT

Conventionally, a custom solution must be built for the integration of secrets stored in a secrets manager. Embodiments integrate secrets using an integration process that retrieves a secret from the secrets manager, marks the secret so that it can be appropriately handled, and stores the secret within a container-level environment extension, such that the secret can be utilized by other integration processes within the same runtime container. For enhanced security, the secret is always encrypted within communications and when at rest (e.g., within the environment extension).

22 Claims, 4 Drawing Sheets

<u>200</u>

100

400

Processor 410

Main Memory 415

I/O Interface 435

Secondary Memory 420

Internal Medium 425

Removable Medium 430

Communication Interface 440

455

450

External System 445

Baseband 460

Radio 465

Antenna 470

Communication Bus 405

SECURE SECRETS MANAGEMENT IN AN INTEGRATION PLATFORM

BACKGROUND

Field of the Invention

The embodiments described herein are generally directed to integration, and, more particularly, to securely managing secrets in an integration platform.

Description of the Related Art

While there are multiple secrets managers available, there is no widely implemented protocol or application programming interface (API) for securely connecting to these secrets managers. Thus, solutions for integrating secrets within an integration platform are generally built custom for a particular organization. It would be advantageous for an organization to be able to securely manage its secrets for its entire integration platform from a central location, regardless of which secrets manager the organization might use.

SUMMARY

Accordingly, systems, methods, and non-transitory computer-readable media are disclosed for secure secrets management in an integration platform.

In an embodiment, a method comprises using at least one hardware processor to: by a first integration process within a runtime container of an integration platform, retrieve a first secret from a secrets manager via an element of the first integration process, wherein the first secret is associated with a parameter that indicates that the first secret is a secret, and store the first secret in an environment extension within the runtime container, wherein the stored first secret is encrypted; and subsequently, by a second integration process within the runtime container, retrieve the first secret from the environment extension, and utilize the first secret within an element of the second integration process.

Retrieving the first secret may comprise encrypting the first secret during communication of the first secret from the secrets manager to the first integration process. The first secret may be encrypted during the communication using an encryption key from a key manager. The encryption key may be a container-level key that is specific to the runtime container.

The stored first secret may be encrypted using an encryption key from a key manager. The encryption key may be a container-level key that is specific to the runtime container.

Utilizing the first secret may comprise decrypting the first secret retrieved from the environment extension, wherein the second integration process securely deletes the decrypted first secret after utilizing the decrypted first secret. Utilizing the first secret may comprise sending the first secret to a third-party system without decrypting the first secret.

The first secret may comprise access information. The access information may be for a third-party system. The first secret may be personally identifiable information.

The method may further comprise using the at least one hardware processor to, by a third integration process within the runtime container: determine whether or not a second secret is stored within the environment extension; when determining that the second secret is stored within the environment extension, retrieve the second secret from the environment extension; when determining that the second secret is not stored within the environment extension, retrieve the second secret from the secrets manager, and store the second secret in the environment extension within the runtime container, wherein the stored second secret is encrypted; and utilize the second secret within an element of the third integration process.

The first integration process may be a dedicated process that periodically retrieves the first secret from the secrets manager, and stores the first secret in the environment extension.

The method may further comprise using the at least one hardware processor to securely delete the environment extension when the runtime container is un-instantiated.

The first secret may represent a data field, wherein the data field is stored in the environment extension. The first secret may represent a data field, wherein a reference to the data field on the secrets manager is stored in the environment extension, without storing the data field itself in the environment extension. Retrieving the first secret from the environment extension may comprise retrieving the first secret from the secrets manager via the reference.

The method may further comprise using the at least one hardware processor to, by the first integration process, pass the first secret from the element of the first integration process to another element of the first integration process, wherein the first secret is stored in the environment extension by the other element of the first integration process.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for secure secrets management in an integration platform. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
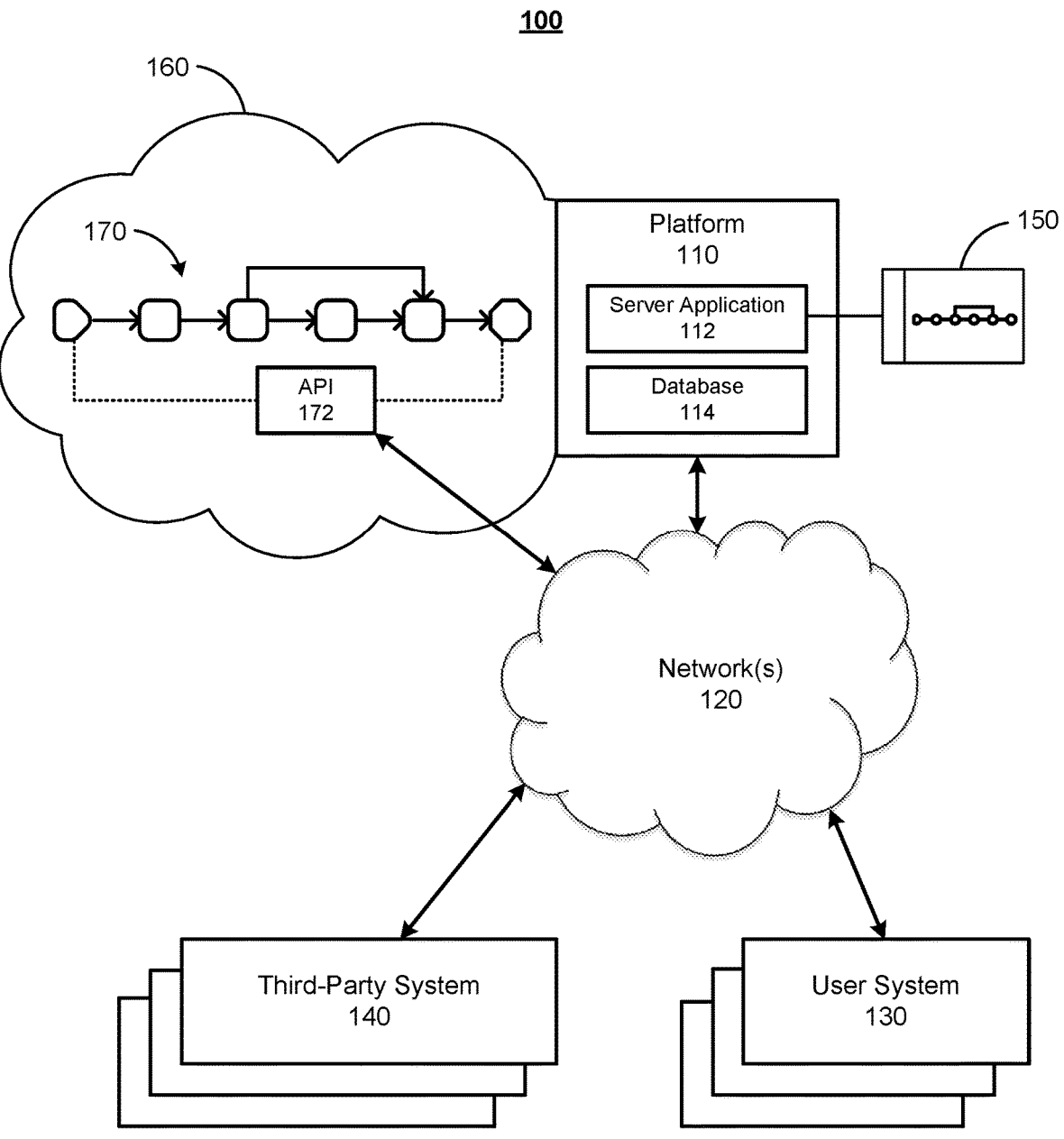
FIG. 1 illustrates an example infrastructure, in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may execute a server application 112, which may comprise one or more software modules implementing one or more of the disclosed processes. Platform 110 may also manage one or more databases 114, which may store data used by server application 112.

Platform 110 may be communicatively connected to one or more networks 120. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems, including user system(s) 130 and/or third-party system(s) 140, through a single set of network(s) 120, it should be understood that platform 110 may be connected to the various systems via different sets of one or more networks. For example, platform 110 may be connected to a subset of systems via the Internet, but may be connected to another subset of systems via an intranet.

Platform 110 may be communicatively connected to one or more user systems 130 via network(s) 120. While only a few user systems 130 are illustrated, it should be understood that platform 110 may be communicatively connected to any number of user systems 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer that has a user account for accessing server application 112 on platform 110.

Server application 112 may manage an integration environment 160. In particular, server application 112 may provide a user interface 150 (e.g., graphical user interface) and backend functionality, including one or more of the processes disclosed herein, to enable users, via user systems 130, to construct, develop, modify, save, delete, test, deploy, undeploy, and/or otherwise manage integration processes 170 within integration environment 160. Of particular relevance to the present disclosure, the backend functionality of server application 112 may provide one or more processes for secure secrets management within integration environment 160.

Although only a single integration process 170 is illustrated, it should be understood that, in reality, integration environment 160 may comprise any number of integration processes 170. In an embodiment, integration environment 160 supports integration platform as a service (iPaaS), such as the iPaaS offered by Boomi, LP of Chesterbrook, Pennsylvania. In this case, integration environment 160 may comprise one or a plurality of integration platforms that each comprises one or more integration processes 170. Each integration platform may be associated with an organization, which may be associated with one or more user accounts by which respective user(s) manage the organization's integration platform, including the various integration process(es) 170. The integration platform may be spun up (e.g., within a runtime container) and spun down, according to real-time demand and/or user operations.

Each integration process 170 may represent a transaction involving the integration of data between two or more systems, and may comprise a series of elements that specify logic and transformation requirements for the data to be integrated. Each element, which may also be referred to as a "step" or "shape," may transform, route, and/or otherwise manipulate data to attain an end result from input data. For example, a basic integration process 170 may receive data from one or more data sources (e.g., via an application programming interface 172 of the integration process 170), manipulate the received data in a specified manner (e.g., including analyzing, normalizing, altering, updated, enhancing, and/or augmenting the received data), and send the manipulated data to one or more specified destinations. An integration process 170 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

The user of a user system 130 may authenticate with platform 110 using standard authentication means, to access server application 112 in accordance with permissions or roles of the associated user account. The user may then interact with server application 112 to manage one or more integration processes 170, for example, within a larger integration platform within integration environment 160. It should be understood that multiple users, on multiple user systems 130, may manage the same integration process(es) 170 and/or different integration processes 170 in this manner, according to the permissions or roles of their associated user accounts.

Each integration process 170, when deployed, may be communicatively coupled to network(s) 120. For example, each integration process 170 may comprise an application programming interface (API) 172 that enables clients to access integration process 170 via network(s) 120. A client may push data to integration process 170 through application programming interface 172 and/or pull data from integration process 170 through application programming interface 172.

One or more third-party systems 140 may be communicatively connected to network(s) 120, such that each third-party system 140 may communicate with an integration process 170 in integration environment 160 via application programming interface 172. Third-party system 140 may host and/or execute a software application that pushes data to integration process 170 and/or pulls data from integration process 170, via application programming interface 172. Additionally or alternatively, an integration process 170 may push data to a software application on third-party system 140 and/or pull data from a software application on third-party system 140, via an application programming interface of the third-party system 140. Thus, third-party system 140 may be a client or consumer of one or more integration processes 170, a data source for one or more integration processes 170, a destination for one or more integration processes 170, and/or the like. As examples, the software application on third-party system 140 may comprise, without limitation, enterprise resource planning (ERP) software, customer relationship management (CRM) software, accounting software, a secrets manager, and/or the like.

2. Example Architecture

Figure 2:
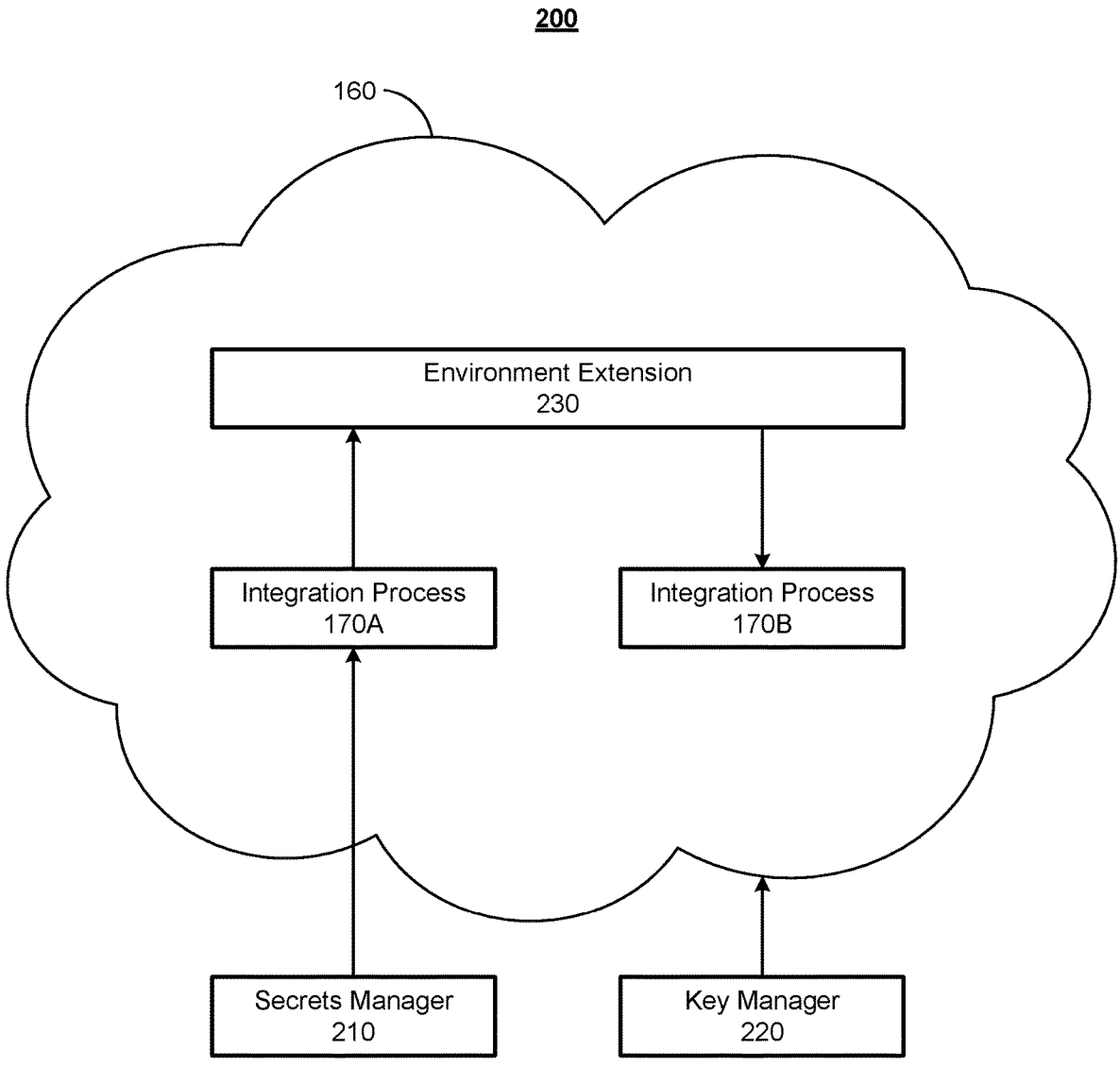
FIG. 2 illustrates an example architecture for secure secrets management in an integration platform, according to an embodiment.

FIG. 2 illustrates an example architecture 200 for secure secrets management in an integration platform, according to an embodiment. It should be understood that a secret may be any information that an organization wishes to keep confidential. Common secrets include access information, such as account credentials (e.g., usernames and passwords), passwords (e.g., database passwords), digital certificates, Secure Shell (SSH) keys, application programming interface (API) keys, encryption keys, and/or the like. However, secrets are not limited to access information. Other types of secrets may include, without limitation, personal information, including personally identifiable information (PII), trade secrets, financial information (e.g., bank account numbers, credit card numbers, etc.), Internet Protocol (IP) addresses, electronic health information, and the like. Thus, it should be understood that the term "secret" does not imply anything about the content of the information. Rather, the term "secret" simply means that an organization has determined that the information is sensitive and should be secured.

An organization stores its secrets in a secrets manager 210. Conventionally, secrets are stored in plaintext, but disclosed embodiments are agnostic to the format in which the secrets are stored. Secrets manager 210 may be internal or external to platform 110. An internal secrets manager 210 may be implemented on platform 110 (e.g., by server application 112) and/or hosted within integration environment 160. However, it will generally be assumed herein that secrets manager 210 is hosted on a third-party system 140 that is external to platform 110. In any case, secrets manager 210 may be a third-party application that implements any arbitrary protocol and/or application programming interface. The disclosed architecture 200 will work with any secrets managers 210, regardless of the particular protocols or application programming interfaces that are used.

Key manager 220 may store one or more encryption and/or decryption keys for encrypting and/or decrypting communications and/or data at rest or otherwise within integration environment 160. Key manager 220 may be internal or external to platform 110. However, for enhanced security, it is generally contemplated that key manager 220 is internal to platform 110. For example, key manager 220 may be implemented on platform 110 (e.g., by server application 112) and/or hosted within integration environment 160.

Key manager 220 may store different keys for different levels or uses. For example, key manager 220 may store a container-level key for each runtime environment, an account-level key for each organization that utilizes integration environment 160, a system-level key for the entire integration environment 160, and/or the like. The container-level key may be used to encrypt/decrypt data within the specific runtime container in which a particular instance of an integration platform for an organization is running. The account-level key may be used to encrypt/decrypt communications within integration environment 160, between integration environment 160 and a third-party system 140 (e.g., including potentially secrets manager 210), data stored persistently and/or temporarily in integration environment 160, and/or the like, for the particular organization with which the account-level key is associated. The system-level key may be used to encrypt/decrypt communications and/or data that are not specific to a particular organization.

At least one integration process 170A may communicate with secrets manager 210 (e.g., via network 120 for an external secrets manager 210 or within integration environment 160 for an internal secrets manager 210). In particular, one of the elements of integration process 170A may be an adapter, which may also be referred to as a "connector." For instance, Boomi offers pre-built adapters (e.g., via user interface 150) that are designed to interface with the application programming interfaces of numerous third-party software applications. In an embodiment, platform 110 may offer pre-built adapters for common secrets managers 210. However, organizations may still build their own customer adapters via user interface 150. In some cases, for the sake of security, an organization may want to utilize a proprietary secrets manager 210 that utilizes a proprietary application programming interface, which the organization does not want exposed as a pre-built adapter. Accordingly, disclosed embodiments provide the organization with the flexibility to build its own adapters. In this case, platform 110 may provide best practices, examples, templates, and/or the like for the organization to utilize when building the adapter.

Each adapter may receive or send data according to a profile that describes a schema of the data. This schema may specify each data field that is to be received or sent by the adapter, as well as one or more properties of each data field. The one or more properties of a data field may be implemented as one or more parameters associated with the data field. In an embodiment, one of these parameters indicates whether or not the data field represents a secret. For example, the data field may be marked as "sensitive" or "secret" to indicate that it represents a secret, or marked with a different indicator to indicate that it does not represent a secret. Thus, an organization can specify the individual data fields that are to be received or sent by each adapter, and mark any data fields that are secrets as secrets.

Additionally, some data fields may be automatically marked as secrets when the profile is generated. For example, access information may be automatically marked as secrets. In this case, the organization may or may not be given the option to unmark automatically marked data fields as secrets.

Any data field that is marked as a secret in the profile will always be encrypted in any communication within or outside of integration environment 160, as well as whenever that data field is at rest (i.e., stored) within integration environment 160. For example, whenever a secret data field is communicated, the secret data field may be encrypted using an encryption key (e.g., container-level or account-level encryption key) from key manager 220. In addition, whenever a secret data field is stored within integration environment 160, the secret data field may be encrypted using an encryption key (e.g., the same or a different encryption key as used for communication) from key manager 220. Thus, even if the data field leaks from integration environment 160, the data field will be encrypted.

An integration process 170 (e.g., 170A), with an adapter whose profile specifies that one or more data fields are secrets, will ensure that the secret data fields are always encrypted. In particular, the properties of each data field may be persisted throughout the entire integration process 170, so that each element in integration process 170 maintains the encryption of any secret data fields.

In addition, any data field that is marked as a secret will not be used or stored anywhere that it should not be. For example, secret data fields will not be included in logs, test data, or other system tools that implicate data within integration environment 160. In particular, systems that manage these tools may check the parameter(s) associated with each data field, and filter out any data fields that are associated with a parameter indicating that the data field is secret.

In an embodiment, an environment extension 230 is maintained within integration environment 160 for each integration platform. In other words, environment extension 230 is specific to a particular organization's integration platform and is not shared with any other organization's integration platform (e.g., in the event that integration environment 160 is an iPaaS environment that supports multiple organizations' integration platforms). Environment extension 230 is a secure enclave that can be used to store data fields that are used across a plurality of integration processes 170 within a single runtime container in integration environment 160. This plurality of integration processes 170 may be different instances of the same integration process 170 or instances of different integration processes 170 within the runtime container. In an embodiment, environment extension 230 is runtime-only, such that it is securely deleted when the runtime container is un-instantiated (e.g., spun down on an iPaaS platform).

An element of integration process 170A may store a data field within environment extension 230, and any other integration process 170B with access to environment extension 230 may retrieve that data field from environment extension 230 for use by one or more of its elements. In particular, integration process 170A may comprise an environment-extension storage element, in addition to the adapter described above. The adapter of integration process 170A may retrieve a secret from secrets manager 210, and pass the secret to the environment-extension storage element, which then stores the secret in environment extension 230 (e.g., without unencrypting the secret). Alternatively, the adapter of integration process 170A could both retrieve the secret from secrets manager 210 and store the secret in environment extension 230. Integration process 170B may comprise an environment-extension retrieval element that retrieves a specified secret from environment extension 230.

Whenever a data field that is marked as secret is stored within environment extension 230, that data field is encrypted using an encryption key (e.g., container-level or account-level encryption key) from key manager 220. Data fields that may be useful to store in environment extension 230 include access information for a data store (e.g., third-party system 140 as a data source or destination), which may be utilized by a plurality of integration processes 170 requiring access to that data store.

In some scenarios, a secret data field may never be decrypted within integration environment 160. This might be the case when the data field is simply relayed or moved between two external systems (e.g., secrets manager 210 and a third-party system 140) by one or more integration processes 170, without ever being used in unencrypted form within integration environment 160. For example, an integration process 170 may comprise or consist of an input adapter that retrieves secrets from secrets manager 210 and an output adapter that transmits the secrets to a third-party system 140. In this case, the secret data field may be communicated (e.g., without ever being stored in environment extension 230) as encrypted ciphertext, thereby providing at least two levels of security. The ciphertext may be encrypted using a container-level encryption key from key manager 220. In an embodiment, a secret is only ever decrypted within integration environment 160 when an element of an integration process 170 needs to utilize the secret in its unencrypted form, and even then, the decrypted form of the secret is immediately and securely deleted after use.

In some cases, a secret data field may be stored, within environment extension 230, only as a reference (e.g., pointer) to secrets manager 210. In other words, the data field itself is never stored within environment extension 230, which improves security. The reference may comprise a path to the location of the data field on secrets manager 210. An integration process 170 that utilizes the data field (e.g., 170B) may retrieve the data field via the reference in environment extension 230. For example, when an integration process 170 requests the data field, environment extension 230 may retrieve the data field from secrets manager 210 and relay that data field to the requesting integration process 170. Alternatively, environment extension 230 may return the reference to the requesting integration process 170, and then that integration process 170 may retrieve the data field directly from secrets manager 210.

In an embodiment, the same parameter that marks a data field as secret or not secret may also specify a level of secrecy. Alternatively, another parameter associated with the data field may specify the level of secrecy. In such an embodiment, whether a secret is stored in environment extension 230 as an actual data field or as a reference may depend on the level of secrecy. In particular, secrets with a higher level of secrecy may be stored as references, whereas secrets with a lower level of secrecy may be stored as actual data fields, within environment extension 230. Alternatively, all secrets may be treated the same (e.g., all stored as actual data fields, or all stored as references). As another alternative, each data field (e.g., in the profile of an adapter of an integration process 170) may be associated with a distinct parameter that indicates whether the secret is to be stored as an actual data field or as a reference. In this case, the organization can specify which secrets are stored as actual data fields and which secrets are stored as references.

Notably, an organization could build an integration process 170 (e.g., 170A) that is dedicated to retrieving and storing one or more secrets within environment extension 230. For example, the sole role of integration process 170A may be to retrieve one or more secret data fields from secrets manager 210 and store them in environment extension 230, where they can be used by one or more other integration processes 170 (e.g., 170B) in the same runtime container. Integration process 170A may retrieve the secret data field(s) periodically (e.g., after each expiration of a time interval, such as a minute, several minutes, half an hour, an hour, twelve hours, twenty-four hours, etc.) and/or in response to one or more triggering events (e.g., a user operation, an event produced by another integration process 170, an input from a third-party system 140, a request sent by secrets manager 210, etc.). When writing the secret data field(s) to environment extension 230, integration process 170A may overwrite previously stored versions of the secret data field(s) within environment extension 230. Thus, the most recent versions of the secret data field(s) will always be available to other integration processes 170 that have access to environment extension 230. As discussed above, instead of the actual secret data fields being stored in environment extension 230, integration process 170A may store references, to the location(s) of the secret data field(s) within secrets manager 210, in environment extension 230.

It should be understood that, even if there is not a dedicated integration process 170 to import secrets into environment extension 230, any secret that is stored in environment extension 230, whether as an actual data field or a reference to a data field on secrets manager 210, may be used by any one or more other integration processes 170 that have access to environment extension 230 (e.g., in the same runtime container). For example, one element of integration process 170A may retrieve a secret for use in another element of integration process 170A, and store that secret in environment extension 230. Independently and subsequently, integration process 170B, in the same runtime container as integration process 170A, may need to use the same secret. Accordingly, integration process 170B may first check environment extension 230 to determine whether the secret has been stored in environment extension 230. If the secret has been stored in environment extension 230, integration process 170B may retrieve the secret via environment extension 230. Otherwise, if the secret has not been stored in environment extension 230, integration process 170B may obtain the secret directly from secrets manager 210, and then store the secret in environment extension 230 for subsequent use by integration process 170B or any other integration process 170 in the same runtime container. Thus, environment extension 230 may act as a container-level cache for secrets used by the integration processes 170 within a runtime container.

3. Example Use Case

One concrete example will now be described for how a secret may be managed in integration environment 160. In this example, the secret is assumed to be access information, such as a username, password, API key, or the like, for accessing a third-party system 140. Initially, an organization spins up an integration platform within a runtime container in integration environment 160. This integration platform includes a plurality of integration processes 170, including integration processes 170A and 170B, and a container-level environment extension 230.

Integration process 170A executes and, assuming that the secret is not already stored in environment extension 230, retrieves the secret from secrets manager 210. During the communication of the secret from secrets manager 210 to integration process 170A, the secret is encrypted using an encryption key (e.g., container-level encryption key) from key manager 220. Integration process 170A may be a dedicated process for retrieving secrets or may be a process that needs to access third-party system 140. For the sake of the example, it will be assumed that integration process 170A is a process that needs access to third-party system 140 (e.g., to retrieve data or to send data). In a conventional system, a user for the organization would have to manually enter the access information when configuring integration process 170A. However, in disclosed embodiments, the user does not have to manually enter this access information. Instead, the user leaves a placeholder for this information when configuring integration process 170A, and the access information is automatically retrieved from secrets manager 310 at runtime and inserted into the placeholder.

Having retrieved the secret from secrets manager 210, integration process 170A may decrypt the secret using a decryption key (e.g., container-level decryption key) from key manager 220. Integration process 170A then utilizes the decrypted secret to access third-party system 140. In addition, integration process 170A may encrypt the secret using an encryption key (e.g., container-level encryption key) from key manager 220, store the secret in environment extension 230, and securely delete the decrypted form of the secret used to access third-party system 140. Alternatively, integration process 170A may simply store the encrypted secret from the communication with secrets manager 310 in environment extension 230. In either case, the secret is encrypted when at rest. As discussed elsewhere herein, the secret may be stored as an actual data field or as a reference to a data field on secrets manager 210.

Subsequently, integration process 170B may have need for the secret. For example, integration process 170B may need to access third-party system 140 (e.g., to retrieve data or to send data). Integration process 170B may check environment extension 230 to determine whether another integration process 170 has already retrieved the secret. In this case, integration process 170B will find the secret, since the secret has been previously stored by integration process 170A. Accordingly, integration process 170B may decrypt the secret using the decryption key from key manager 220. Integration process 170B then utilizes the decrypted secret to access third-party system 140. After use, integration process 170B may securely delete the decrypted form of the secret used to access third-party system 140.

At some subsequent time, the runtime container for the integration platform may be spun down. At this time, environment extension 230 may be securely deleted, such that no data, including any secrets, within the environment extension 230 persist anywhere within integration environment 160.

4. Example Process

Figure 3:
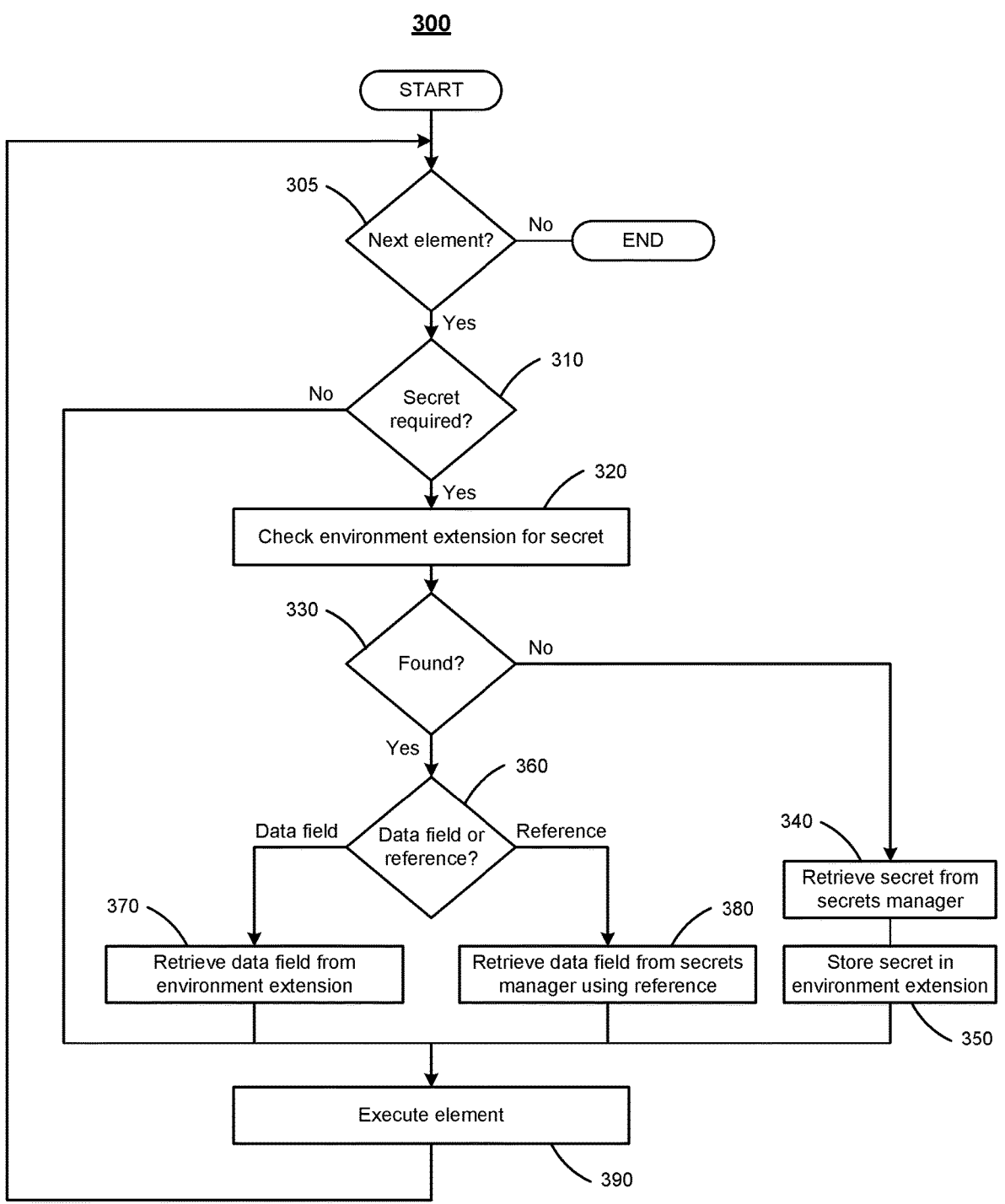
FIG. 3 illustrates an example process for secure secrets management in an integration platform, according to an embodiment.

FIG. 3 illustrates an example process 300 for secure secrets management in an integration environment 160, according to an embodiment. Process 300 may be implemented by integration environment 160 for each of one or more integration processes 170, in parallel and/or in serial, within a single runtime container. While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Initially, in subprocess 305, it is determined whether or not another element remains to be executed in integration process 170. An integration process 170 may comprise a sequence of one or more, and generally a plurality of, elements. One of these elements may be an adapter that is configured to retrieve a secret. Alternatively or additionally, one of these elements may utilize or manipulate the secret in some manner. In any case, process 300 may iterate through each element in integration process 170. When another element remains to be considered (i.e., "Yes" in subprocess 305), process 300 proceeds to subprocess 310 to consider the next element in the sequence. Otherwise, when no more elements remain to be considered (i.e., "No" in subprocess 305), process 300 may end.

In subprocess 310, it is determined whether or not the element requires a secret. For example, the element may need secret access information to access a third-party system 140. Alternatively or additionally, the element may need to process one or more secret data fields. It may be determined whether or not the element requires a secret by searching a profile of the element for any data fields that are marked as secret (e.g., any data fields associated with a parameter indicating that the data field is to be kept secret). Any data fields that are marked as secrets will be determined to be a secret. When a secret is required by the element (i.e., "Yes" in subprocess 310), process 300 proceeds to subprocess 320. Otherwise, when no secret is required by the element (i.e., "No" in subprocess 310), process 300 skips to subprocess 390.

In subprocess 320, environment extension 230 is checked to determine whether or not environment extension 230 is storing the secret. For example, environment extension 230 may be queried for the secret. If environment extension 230 is storing the secret, environment extension 230 may return the secret. If environment extension 230 is not storing the secret, environment extension 230 may indicate that it does not have the secret.

In subprocess 330, it is determined whether or not the secret was found in subprocess 320. When the secret was not found in subprocess 320 (i.e., "No" in subprocess 330), process 300 proceeds to subprocess 340. When the secret was found in subprocess 320 (i.e., "Yes" in subprocess 330), process 300 proceeds to subprocess 360.

In subprocess 340, the secret is retrieved from secrets manager 210. As discussed elsewhere herein, integration process 170 may communicate with secrets manager 210 directly to retrieve the secret. The communication of the secret, from secrets manager 210 to integration process 170, may be encrypted using a container-level, account-level, and/or system-level encryption key from key manager 220.

In subprocess 350, the secret may be stored in environment extension 230 for the runtime container. As discussed elsewhere herein, the secret may be stored as either an actual data field or a reference (i.e., without storing the data field itself). In either case, the actual data field or reference may be encrypted using a container-level encryption key from key manager 220 before being stored in environment extension 230. This ensures that the secret is never unencrypted when at rest.

In subprocess 360, it is determined whether the secret is stored in environment extension 230 as an actual data field or as a reference. When determining that the secret is stored as an actual data field (i.e., "Data field" in subprocess 360), process 300 proceeds to subprocess 370. Otherwise, when determining that the secret is stored as a reference (i.e., "Reference" in subprocess 360), process 300 proceeds to subprocess 380.

In an embodiment, secrets may be stored in environmental extension 230 as either an actual data field or as a reference. This may be determined by a parameter that is associated with each data field, which may be in addition to the parameter that specifies whether or not that data field is a secret or as another possible value of that parameter. In an alternative embodiment, all secrets may be stored as actual data fields with no secrets being stored as references, or all secrets may be stored as references with no secrets being stored as actual data fields. It should be understood that, in this alternative embodiment, subprocess 360 may be omitted, since subprocess 330 will always proceed to either subprocess 370 (i.e., if only actual data fields are stored) or subprocess 380 (i.e., if only references are stored).

In subprocess 370, the data field, representing the secret, is retrieved from environment extension 230. In this manner, environment extension 230 may act as a local cache for the runtime container of the integration platform. As discussed elsewhere herein, the data field will be encrypted while stored in environment extension 230.

In subprocess 380, the data field, representing the secret, is retrieved from secrets manager 210 using the reference. In particular, the reference may comprise a path that can be followed to the location of the data field within secrets manager 210. As discussed elsewhere herein, the communication of the data field from secrets manager 210 to integration process 170 may be encrypted using a container-level, account-level, and/or system-level encryption key from key manager 220.

In subprocess 390, the element is executed. In the event that execution of the element involves a secret, as retrieved in subprocesses 340, 370, or 380, and the secret must be decrypted to execute the element, the secret may be decrypted in subprocess 390 using a decryption key (e.g., corresponding to whatever encryption key was used to encrypt the secret) from key manager 220. After utilizing the secret, the decrypted secret may then be securely deleted. In the event that execution of the element involves a secret, but the secret does not have to be decrypted to execute the element, the secret may remain decrypted in subprocess 390. This may be the case where the secret data field is simply relayed by the element (e.g., to another element or to a third-party system 140). Then, process 300 returns to subprocess 305 to determine whether or not another element of integration process 170 remains to be executed.

It should be understood that, in the event that an element of integration process 170 utilizes a plurality of secrets, each secret may be individually processed through an iteration of subprocesses 320-380. In other words, a first subset of one or more secrets may be retrieved from environment extension 230 (i.e., in subprocess 370), while a second subset of one or more secrets may be retrieved from secrets manager 210 (i.e., in subprocess 340 and/or 380).

5. Example Processing System

Figure 4:
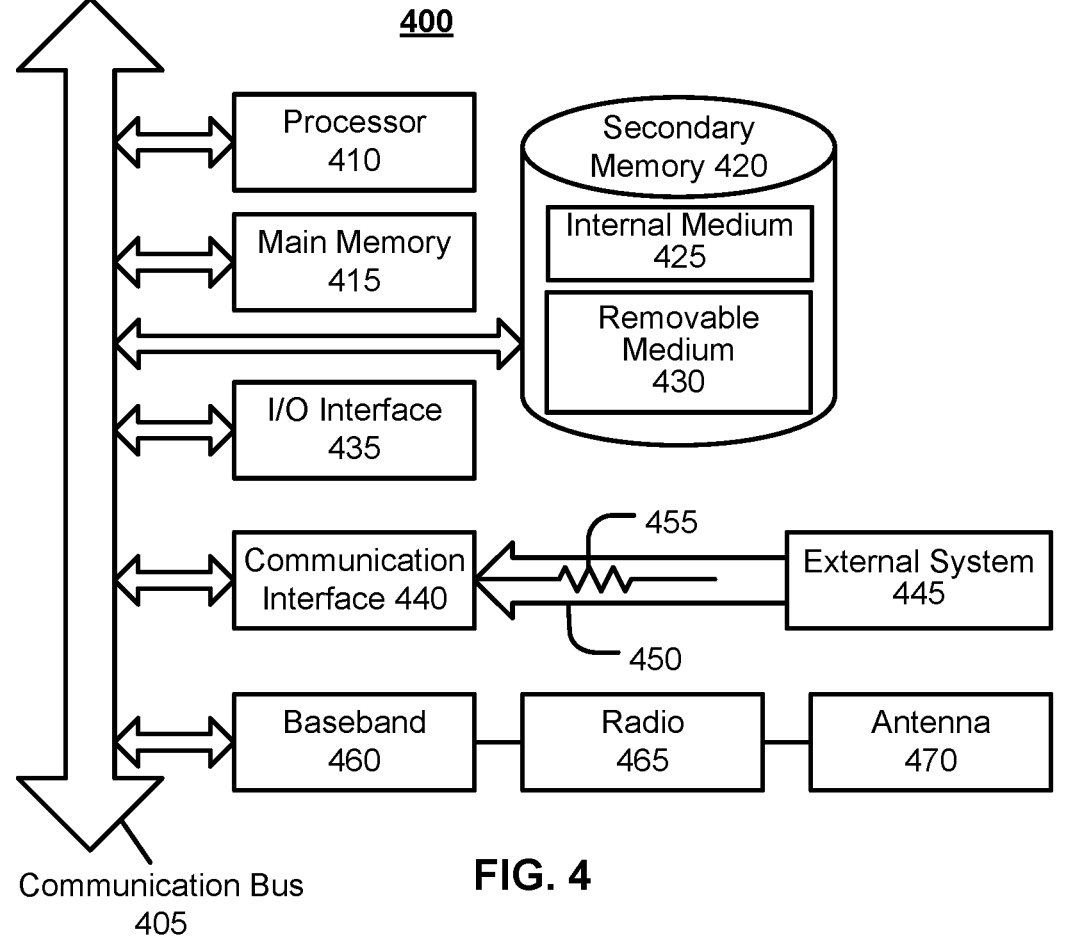
FIG. 4 illustrates an example processing system, by which one or more of the processes described herein may be executed, according to an embodiment.

FIG. 4 illustrates an example processing system, by which one or more of the processes described herein may be executed, according to an embodiment. For example, system 400 may be used to store and/or execute software that implements process 300, and/or may represent components of platform 110, user system(s) 130, third-party system(s) 140, architecture 200, and/or other processing devices described herein. System 400 can be any processor-enabled device (e.g., server, personal computer, etc.) that is capable of wired or wireless data communication. Other processing systems and/or architectures may also be used, as will be clear to those skilled in the art.

System 400 may comprise one or more processors 410. Processor(s) 410 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 410. Examples of processors which may be used with system 400 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 410 may be connected to a communication bus 405. Communication bus 405 may include a data channel for facilitating information transfer between storage and other peripheral components of system 400. Furthermore, communication bus 405 may provide a set of signals used for communication with processor 410, including a data bus, address bus, and/or control bus (not shown). Communication bus 405 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 400 may comprise main memory 415. Main memory 415 provides storage of instructions and data for programs executing on processor 410, such as any of the software discussed herein. It should be understood that programs stored in the memory and executed by processor 410 may be written and/or compiled according to any suitable language, including without limitation C/C++, Java, JavaScript, Perl, Python, Visual Basic, .NET, and the like. Main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 400 may comprise secondary memory 420. Secondary memory 420 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 400. The computer software stored on secondary memory 420 is read into main memory 415 for execution by processor 410. Secondary memory 420 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 420 may include an internal medium 425 and/or a removable medium 430. Internal medium 425 and removable medium 430 are read from and/or written to in any well-known manner. Internal medium 425 may comprise one or more hard disk drives, solid state drives, and/or the like. Removable storage medium 430 may be, for example, a magnetic tape drive, a compact disc (CD) drive, a digital versatile disc (DVD) drive, other optical drive, a flash memory drive, and/or the like.

System 400 may comprise an input/output (I/O) interface 435. I/O interface 435 provides an interface between one or more components of system 400 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 400 may comprise a communication interface 440. Communication interface 440 allows software to be transferred between system 400 and external devices, networks, or other information sources. For example, computer-executable code and/or data may be transferred to system 400 from a network server via communication interface 440. Examples of communication interface 440 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 400 with a network (e.g., network 120) or another computing device. Communication interface 440 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 440 is generally in the form of electrical communication signals 455. These signals 455 may be provided to communication interface 440 via a communication channel 450 between communication interface 440 and an external system 445. In an embodiment, communication channel 450 may be a wired or wireless network (e.g., network(s) 120), or any variety of other communication links. Communication channel 450 carries signals 455 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 415 and/or secondary memory 420. Computer-executable code can also be received from an external system 445 via communication interface 440 and stored in main memory 415 and/or secondary memory 420. Such computer-executable code, when executed, enables system 400 to perform the various functions of the disclosed embodiments as described elsewhere herein.

In an embodiment that is implemented using software, the software may be stored on a computer-readable medium and initially loaded into system 400 by way of removable medium 430, I/O interface 435, or communication interface 440. In such an embodiment, the software is loaded into system 400 in the form of electrical communication signals 455. The software, when executed by processor 410, preferably causes processor 410 to perform one or more of the processes and functions described elsewhere herein.

System 400 may optionally comprise wireless communication components that facilitate wireless communication over a voice network and/or a data network (e.g., in the case of user system 130). The wireless communication components comprise an antenna system 470, a radio system 465, and a baseband system 460. In system 400, radio frequency (RF) signals are transmitted and received over the air by antenna system 470 under the management of radio system 465.

In an embodiment, antenna system 470 may comprise one or more antennae and one or more multiplexors (not shown) that perform a switching function to provide antenna system 470 with transmit and receive signal paths. In the receive path, received RF signals can be coupled from a multiplexor to a low noise amplifier (not shown) that amplifies the received RF signal and sends the amplified signal to radio system 465.

In an alternative embodiment, radio system 465 may comprise one or more radios that are configured to communicate over various frequencies. In an embodiment, radio system 465 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 465 to baseband system 460.

If the received signal contains audio information, then baseband system 460 decodes the signal and converts it to an analog signal. Then the signal is amplified and sent to a speaker. Baseband system 460 also receives analog audio signals from a microphone. These analog audio signals are converted to digital signals and encoded by baseband system 460. Baseband system 460 also encodes the digital signals for transmission and generates a baseband transmit audio signal that is routed to the modulator portion of radio system 465. The modulator mixes the baseband transmit audio signal with an RF carrier signal, generating an RF transmit signal that is routed to antenna system 470 and may pass through a power amplifier (not shown). The power amplifier amplifies the RF transmit signal and routes it to antenna system 470, where the signal is switched to the antenna port for transmission.

Baseband system 460 is communicatively coupled with processor(s) 410, which have access to memory 415 and 420. Thus, software can be received from baseband processor 460 and stored in main memory 410 or in secondary memory 420, or executed upon receipt. Such software, when executed, can enable system 400 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

by a first integration process within a runtime container of an integration platform, retrieve a first secret from a secrets manager via an element of the first integration process, wherein the first secret is associated with a parameter that indicates that the first secret is a secret, and store the first secret in an environment extension within the runtime container, wherein the stored first secret is encrypted;

subsequently, by a second integration process within the runtime container, retrieve the first secret from the environment extension, and utilize the first secret within an element of the second integration process; and securely delete the environment extension when the runtime container is un-instantiated.

2. The method of claim 1, wherein retrieving the first secret comprises encrypting the first secret during communication of the first secret from the secrets manager to the first integration process.

3. The method of claim 2, wherein the first secret is encrypted during the communication using an encryption key from a key manager.

4. The method of claim 3, wherein the encryption key is a container-level key that is specific to the runtime container.

5. The method of claim 1, wherein the stored first secret is encrypted using an encryption key from a key manager.

6. The method of claim 5, wherein the encryption key is a container-level key that is specific to the runtime container.

7. The method of claim 1, wherein utilizing the first secret comprises decrypting the first secret retrieved from the environment extension, and wherein the second integration process securely deletes the decrypted first secret after utilizing the decrypted first secret.

8. The method of claim 1, wherein utilizing the first secret comprises sending the first secret to a third-party system without decrypting the first secret.

9. The method of claim 1, wherein the first secret comprises access information.

10. The method of claim 9, wherein the access information is for a third-party system.

11. The method of claim 1, wherein the first secret is personally identifiable information.

12. The method of claim 1, further comprising using the at least one hardware processor to, by a third integration process within the runtime container:

determine whether or not a second secret is stored within the environment extension;

when determining that the second secret is stored within the environment extension, retrieve the second secret from the environment extension;

when determining that the second secret is not stored within the environment extension, retrieve the second secret from the secrets manager, and store the second secret in the environment extension within the runtime container, wherein the stored second secret is encrypted; and utilize the second secret within an element of the third integration process.

13. The method of claim 1, wherein the first integration process is a dedicated process that periodically retrieves the first secret from the secrets manager, and stores the first secret in the environment extension.

14. The method of claim 1, wherein the first secret represents a data field, and wherein the data field is stored in the environment extension.

15. The method of claim 1, wherein the first secret represents a data field, and wherein a reference to the data field on the secrets manager is stored in the environment extension, without storing the data field itself in the environment extension.

16. The method of claim 15, wherein retrieving the first secret from the environment extension comprises retrieving the first secret from the secrets manager via the reference.

17. The method of claim 1, further comprising using the at least one hardware processor to, by the first integration process, pass the first secret from the element of the first integration process to another element of the first integration process, wherein the first secret is stored in the environment extension by the other element of the first integration process.

18. A system comprising:

at least one hardware processor; and software that is configured to, when executed by the at least one hardware processor, perform the method of claim 1.

19. A non-transitory computer-readable medium having instructions stored therein, wherein the instructions, when executed by a processor, cause the processor to perform the method of claim 1.

20. A method comprising using at least one hardware processor to:

by a first integration process within a runtime container of an integration platform, retrieve a first secret from a secrets manager via an element of the first integration process, wherein the first secret is associated with a parameter that indicates that the first secret is a secret, and store the first secret in an environment extension within the runtime container, wherein the stored first secret is encrypted;

subsequently, by a second integration process within the runtime container, retrieve the first secret from the environment extension, and utilize the first secret within an element of the second integration process; and by a third integration process within the runtime container, determine whether or not a second secret is stored within the environment extension, when determining that the second secret is stored within the environment extension, retrieve the second secret from the environment extension, when determining that the second secret is not stored within the environment extension, retrieve the second secret from the secrets manager, and store the second secret in the environment extension within the runtime container, wherein the stored second secret is encrypted, and utilize the second secret within an element of the third integration process.

21. A system comprising:

at least one hardware processor; and software that is configured to, when executed by the at least one hardware processor, perform the method of claim 20.

22. A non-transitory computer-readable medium having instructions stored therein, wherein the instructions, when executed by a processor, cause the processor to perform the method of claim 20.

* * * * *